(12) United States Patent
Park et al.

(10) Patent No.: US 10,389,777 B2
(45) Date of Patent: *Aug. 20, 2019

(54) TRANSMITTING APPARATUS, RECEIVING APPARATUS, AND CONTROL METHODS THEREOF

(71) Applicant: SAMSUNG ELECTRONICS CO., LTD., Suwon-si (KR)

(72) Inventors: Jung-hyun Park, Hwaseong-si (KR); Min-ho Kim, Hwaseong-si (KR); Sung-woo Park, Suwon-si (KR); Sung-kyu Jung, Seongnam-si (KR); Chang-hoon Choi, Yongin-si (KR); Doo-chan Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,215

(22) Filed: Mar. 4, 2019

(65) Prior Publication Data

US 2019/0199764 A1    Jun. 27, 2019

Related U.S. Application Data

(63) Continuation of application No. 15/959,484, filed on Apr. 23, 2018, now Pat. No. 10,225,297, which is a
(Continued)

(30) Foreign Application Priority Data

Jul. 12, 2016    (KR) .................. 10-2016-0087975

(51) Int. Cl.
*H04L 1/00* (2006.01)
*H04L 5/00* (2006.01)
(Continued)

(52) U.S. Cl.
CPC ........ *H04L 65/4076* (2013.01); *H04L 1/0041* (2013.01); *H04L 1/0045* (2013.01);
(Continued)

(58) Field of Classification Search
CPC ....... H04B 3/32; H04B 3/23; H04L 25/03343; H04L 25/497; H04L 25/03057;
(Continued)

(56) References Cited

U.S. PATENT DOCUMENTS 6,128,355 A * 10/2000 Backman ............. H04B 7/0845
375/347
7,680,461 B2 * 3/2010 Takano ................ H04B 7/0615
370/328
(Continued)

FOREIGN PATENT DOCUMENTS

WO    2011155741 A2    12/2011
WO    2015046829 A1    4/2015

OTHER PUBLICATIONS

Communication dated Oct. 4, 2018, issued by the Canadian Patent Office in counterpart Canadian Application No. 2992969.
(Continued)

*Primary Examiner* — James M Perez
(74) *Attorney, Agent, or Firm* — Sughrue Mion, PLLC

(57) ABSTRACT

A transmitting apparatus is provided. The transmitting apparatus includes: an L1 signaling generator configured to generate L1 signaling including first information and second information; a frame generator configured to generate a frame including a payload including a plurality of sub frames; and a signal processor configured to insert a preamble including the L1 signaling in the frame and transmit the frame. The first information includes information
(Continued)

required for decoding a first sub frame among the plurality of sub frames. Therefore, a processing delay in a receiving apparatus is reduced.

3 Claims, 21 Drawing Sheets

Related U.S. Application Data continuation of application No. 15/217,241, filed on Jul. 22, 2016, now Pat. No. 9,954,917.

(60) Provisional application No. 62/195,883, filed on Jul. 23, 2015.

(51) Int. Cl.
*H04L 29/06* (2006.01)
*H04L 27/26* (2006.01)
*H04L 12/46* (2006.01)

(52) U.S. Cl.
CPC .......... *H04L 1/0071* (2013.01); *H04L 5/0007* (2013.01); *H04L 5/0091* (2013.01); *H04L 12/4633* (2013.01); *H04L 27/2613* (2013.01); *H04L 27/2614* (2013.01); *H04L 27/2665* (2013.01); *H04L 27/2666* (2013.01); *H04L 65/602* (2013.01); *H04L 5/0023* (2013.01)

(58) Field of Classification Search
CPC . H04L 65/4076; H04L 1/0041; H04L 1/0045; H04L 1/0071; H04L 5/0007; H04L 5/0091; H04L 12/4633; H04L 27/2613; H04L 27/2614; H04L 27/2665; H04L 27/2666; H04L 65/602
USPC .................................................. 375/259–352
See application file for complete search history.

(56) References Cited

U.S. PATENT DOCUMENTS

| | | | | |
|---|---|---|---|---|
| 7,720,181 B2* | 5/2010 | Park | .................. | H04L 1/0048 375/341 |
| 7,733,949 B2* | 6/2010 | Jin | .................. | H04B 17/354 375/221 |
| 7,894,507 B2* | 2/2011 | Kent | .................. | H04L 25/0204 375/144 |
| 7,903,775 B2* | 3/2011 | Ku | .................. | H04L 7/0012 375/220 |
| 7,924,943 B2* | 4/2011 | Kim | .................. | H04L 1/0003 375/219 |
| 8,000,421 B2* | 8/2011 | Takano | .................. | H04B 7/02 375/349 |
| 8,027,401 B2* | 9/2011 | Hwang | .................. | H04L 1/005 375/260 |
| 8,050,146 B2* | 11/2011 | Jeon | .................. | H04H 20/57 368/10 |
| 8,176,519 B2* | 5/2012 | Jeon | .................. | H04N 21/41407 455/414.3 |
| 8,189,646 B2* | 5/2012 | Ries | .................. | G01S 19/02 375/140 |
| 8,189,649 B2* | 5/2012 | Yuda | .................. | H04B 7/0619 375/219 |
| 8,223,904 B2* | 7/2012 | Sampath | .................. | H04B 7/0817 375/349 |
| 8,276,175 B2* | 9/2012 | Jeon | .................. | H04H 60/72 725/37 |
| 8,321,893 B2* | 11/2012 | Xu | .................. | H04H 60/00 725/51 |
| 8,359,615 B2* | 1/2013 | Lee | .................. | H04H 20/93 370/392 |
| 8,391,322 B2* | 3/2013 | Kent | .................. | H04B 7/0842 370/335 |
| 8,520,784 B1* | 8/2013 | Lackey | .................. | H04B 7/0619 375/284 |
| 8,635,652 B2* | 1/2014 | Xu | .................. | H04H 20/57 725/62 |
| 8,660,013 B2* | 2/2014 | Yonge, III | .................. | H04L 12/413 370/241 |
| 8,665,938 B2* | 3/2014 | Yu | .................. | H04W 24/10 375/228 |
| 8,699,405 B2* | 4/2014 | Yamaura | .................. | H04B 7/0417 370/277 |
| 8,699,607 B2* | 4/2014 | Seller | .................. | H04L 27/2649 375/256 |
| 8,767,860 B2* | 7/2014 | Catreux | .................. | H04B 7/0615 375/260 |
| 8,861,409 B2* | 10/2014 | Lee | .................. | H04W 36/32 370/310 |
| 8,917,759 B2* | 12/2014 | Xu | .................. | H04L 27/2272 375/214 |
| 8,917,796 B1* | 12/2014 | Mayrench | .................. | H04L 5/0028 375/260 |
| 8,964,682 B2* | 2/2015 | Mourad | .................. | H04W 72/04 370/329 |
| 8,995,594 B2* | 3/2015 | Kesling | .................. | H04B 1/38 375/220 |
| 9,002,299 B2* | 4/2015 | Perahia | .................. | H04L 25/022 370/334 |
| 9,066,333 B2* | 6/2015 | Mourad | .................. | H04W 72/04 |
| 9,130,706 B2* | 9/2015 | Grant | .................. | H04B 7/061 |
| 9,203,674 B2* | 12/2015 | Kobayashi | .................. | H03G 3/3078 |
| 9,300,510 B2* | 3/2016 | You | .................. | H04L 1/0071 |
| 9,325,554 B2* | 4/2016 | Yokokawa | .................. | H04L 25/0232 |
| 9,362,996 B2* | 6/2016 | Murakami | .................. | H04B 7/0456 |
| 9,363,060 B2* | 6/2016 | Mourad | .................. | H04W 72/04 |
| 9,374,141 B2* | 6/2016 | Murakami | .................. | H04B 7/04 |
| 9,503,229 B2* | 11/2016 | Bae | .................. | H04L 5/0007 |
| 9,729,217 B2* | 8/2017 | Murakami | .................. | H04B 7/0456 |
| 9,742,530 B2* | 8/2017 | Atungsiri | .................. | H04L 5/0007 |
| 9,847,900 B2* | 12/2017 | Atungsiri | .................. | H04L 27/2649 |
| 9,942,076 B2* | 4/2018 | Atungsiri | .................. | H04L 27/2649 |
| 9,948,436 B2* | 4/2018 | Atungsiri | .................. | H04L 5/0007 |
| 9,954,704 B2* | 4/2018 | Atungsiri | .................. | H04B 17/336 |
| 9,954,917 B2* | 4/2018 | Park | .................. | H04L 1/0071 |
| 9,967,125 B2* | 5/2018 | Atungsiri | .................. | H04B 7/02 |
| 10,021,447 B2* | 7/2018 | Kim | .................. | H04N 21/4345 |
| 10,050,730 B2* | 8/2018 | Bae | .................. | H04L 5/0007 |
| 10,122,383 B2* | 11/2018 | Park | .................. | H03M 13/1125 |
| 10,141,951 B2* | 11/2018 | Kim | .................. | H03M 13/1157 |
| 10,142,055 B2* | 11/2018 | Jeong | .................. | H03M 13/1165 |
| 10,225,297 B2* | 3/2019 | Park | .................. | H04L 1/0071 |
| 2004/0192218 A1* | 9/2004 | Oprea | .................. | H04L 25/03343 455/73 |
| 2005/0128993 A1* | 6/2005 | Yu | .................. | H04B 7/061 370/342 |
| 2005/0195889 A1* | 9/2005 | Grant | .................. | H04B 1/707 375/148 |
| 2005/0249319 A1* | 11/2005 | Suh | .................. | H04L 25/0228 375/347 |
| 2006/0072607 A1* | 4/2006 | Kent | .................. | H04B 7/0848 370/464 |
| 2006/0072652 A1* | 4/2006 | Kent | .................. | H04B 1/707 375/148 |
| 2006/0072691 A1* | 4/2006 | Kent | .................. | H04L 25/0204 375/349 |
| 2006/0193396 A1* | 8/2006 | Li | .................. | H04B 7/061 375/267 |
| 2006/0285479 A1* | 12/2006 | Han | .................. | H04B 7/0678 370/203 |
| 2007/0041377 A1* | 2/2007 | Song | .................. | H04H 20/59 370/389 |
| 2007/0110135 A1* | 5/2007 | Guess | .................. | H04L 1/0048 375/148 |
| 2007/0140102 A1* | 6/2007 | Oh | .................. | H04B 7/061 370/208 |
| 2007/0150920 A1* | 6/2007 | Lee | .................. | H04H 20/82 725/54 |

(56) References Cited

U.S. PATENT DOCUMENTS

| | | | | |
|---|---|---|---|---|
| 2007/0207727 A1* | 9/2007 | Song | H04H 20/93 | 455/3.06 |
| 2007/0223563 A1* | 9/2007 | Perlow | H04L 25/0224 | 375/130 |
| 2007/0230609 A1* | 10/2007 | Hwang | H04L 1/005 | 375/267 |
| 2007/0260958 A1* | 11/2007 | Li | H04L 1/0048 | 714/755 |
| 2008/0046926 A1* | 2/2008 | Jeon | H04H 60/66 | 725/38 |
| 2008/0046941 A1* | 2/2008 | Sung | H04N 5/44543 | 725/105 |
| 2008/0083006 A1* | 4/2008 | Jeon | H04H 40/18 | 725/118 |
| 2008/0092163 A1* | 4/2008 | Song | H04H 20/16 | 725/39 |
| 2008/0155621 A1* | 6/2008 | Jang | H04N 21/235 | 725/105 |
| 2008/0201746 A1* | 8/2008 | Xu | H04H 20/24 | 725/54 |
| 2008/0227422 A1* | 9/2008 | Hwang | H04B 7/0452 | 455/278.1 |
| 2008/0247364 A1* | 10/2008 | Kim | H04B 7/0671 | 370/336 |
| 2009/0077591 A1* | 3/2009 | Jeon | H04H 20/57 | 725/50 |
| 2009/0083794 A1* | 3/2009 | Lee | H04H 20/93 | 725/39 |
| 2009/0094356 A1* | 4/2009 | Vare | H04N 21/2362 | 709/223 |
| 2009/0100472 A1* | 4/2009 | Jeon | H04N 21/41407 | 725/54 |
| 2009/0204997 A1* | 8/2009 | Xu | H04H 20/57 | 725/54 |
| 2009/0228927 A1* | 9/2009 | Xu | H04H 60/00 | 725/51 |
| 2009/0232244 A1* | 9/2009 | Kawasaki | H04B 7/06 | 375/267 |
| 2009/0303958 A1* | 12/2009 | Vesma | H04H 20/30 | 370/330 |
| 2009/0316807 A1* | 12/2009 | Kim | H04B 7/061 | 375/260 |
| 2010/0085985 A1* | 4/2010 | Pekonen | H04L 1/0071 | 370/474 |
| 2010/0195633 A1* | 8/2010 | Vare | H04W 36/385 | 370/338 |
| 2010/0195752 A1* | 8/2010 | Lee | H04B 7/0452 | 375/267 |
| 2010/0202408 A1* | 8/2010 | Lee | H04W 36/32 | 370/331 |
| 2010/0251078 A1* | 9/2010 | Yokokawa | H03M 13/1105 | 714/776 |
| 2010/0299708 A1* | 11/2010 | Xu | H04H 60/72 | 725/54 |
| 2010/0310022 A1* | 12/2010 | Asjadi | H04L 27/2605 | 375/343 |
| 2011/0013718 A1* | 1/2011 | Ko | H04L 1/0045 | 375/295 |
| 2011/0028106 A1* | 2/2011 | Lee | H04B 7/061 | 455/101 |
| 2011/0081935 A1* | 4/2011 | Yeon | H04W 52/146 | 455/522 |
| 2012/0201332 A1* | 8/2012 | Vapillon | H04L 27/2675 | 375/340 |
| 2012/0236955 A1* | 9/2012 | Zhou | H04B 7/061 | 375/267 |
| 2012/0257586 A1* | 10/2012 | Mourad | H04H 20/16 | 370/329 |
| 2012/0275455 A1* | 11/2012 | Hwang | H04H 60/72 | 370/389 |
| 2012/0300877 A1* | 11/2012 | Murakami | H04L 25/03942 | 375/296 |
| 2013/0051496 A1* | 2/2013 | Li | H04B 1/28 | 375/334 |
| 2013/0114468 A1* | 5/2013 | Hui | H01Q 3/2611 | 370/277 |
| 2013/0121342 A1* | 5/2013 | Kim | H04B 7/0408 | 370/436 |
| 2013/0205344 A1* | 8/2013 | Lee | H04H 20/93 | 725/54 |
| 2013/0219431 A1* | 8/2013 | Hong | H04H 20/42 | 725/54 |
| 2013/0265494 A1* | 10/2013 | Mourad | H04W 72/04 | 348/571 |
| 2013/0265956 A1* | 10/2013 | Mourad | H04W 72/04 | 370/329 |
| 2013/0266085 A1* | 10/2013 | Sesia | H04B 7/0413 | 375/295 |
| 2013/0279380 A1* | 10/2013 | Hong | H04H 20/72 | 370/310 |
| 2013/0322309 A1* | 12/2013 | Smith | H04L 5/14 | 370/281 |
| 2013/0322373 A1* | 12/2013 | Jeon | H04W 72/0406 | 370/329 |
| 2013/0332980 A1* | 12/2013 | Kobayashi | H04N 5/455 | 725/151 |
| 2014/0093013 A1* | 4/2014 | Ouchi | H04B 7/0689 | 375/295 |
| 2014/0269964 A1* | 9/2014 | Du | H04B 7/0452 | 375/267 |
| 2014/0380135 A1* | 12/2014 | Hong | H04H 20/42 | 714/776 |
| 2015/0002326 A1* | 1/2015 | Farley | H03M 1/002 | 341/155 |
| 2015/0012804 A1* | 1/2015 | Yu | H04L 1/0057 | 714/784 |
| 2015/0036764 A1* | 2/2015 | Oh | H04L 27/2613 | 375/295 |
| 2015/0071373 A1* | 3/2015 | Oh | H04L 27/2627 | 375/295 |
| 2015/0071375 A1* | 3/2015 | Kwon | H04L 27/2628 | 375/295 |
| 2015/0085735 A1* | 3/2015 | Shelby | H04L 65/80 | 370/312 |
| 2015/0092882 A1* | 4/2015 | Lee | H04L 27/2602 | 375/295 |
| 2015/0123921 A1* | 5/2015 | Choi | G06F 3/0416 | 345/173 |
| 2015/0229383 A1* | 8/2015 | Chen | H04B 7/0885 | 370/329 |
| 2015/0229507 A1* | 8/2015 | Kim | H04L 27/2692 | 375/260 |
| 2015/0312919 A1* | 10/2015 | Lee | H04B 7/0473 | 370/252 |
| 2015/0358106 A1* | 12/2015 | Limberg | H04L 27/2003 | 375/308 |
| 2016/0182190 A1* | 6/2016 | Ko | H04H 20/42 | 375/303 |
| 2016/0226689 A1* | 8/2016 | Kim | H04L 27/2602 | |
| 2016/0226939 A1* | 8/2016 | Kwak | H04L 65/4076 | |
| 2016/0241365 A1* | 8/2016 | Bae | H04L 5/0007 | |
| 2016/0359603 A1* | 12/2016 | Fay | H04L 65/4076 | |
| 2017/0005761 A1* | 1/2017 | Oh | H04L 5/0007 | |
| 2017/0026140 A1* | 1/2017 | Bae | H04L 5/0007 | |
| 2017/0026152 A1* | 1/2017 | Atungsiri | H04L 5/0007 | |
| 2017/0026220 A1* | 1/2017 | Atungsiri | H04L 27/2649 | |
| 2017/0026432 A1* | 1/2017 | Park | H04L 1/0071 | |
| 2017/0214964 A1* | 7/2017 | Kim | H04N 21/4345 | |
| 2017/0237593 A1* | 8/2017 | Kim | H04L 27/2602 | 375/295 |
| 2018/0192254 A1* | 7/2018 | Lee | H04W 4/06 | |
| 2018/0241790 A1* | 8/2018 | Park | H04L 1/0071 | |
| 2018/0323889 A1* | 11/2018 | Bae | H04L 5/0007 | |
| 2018/0324485 A1* | 11/2018 | Kim | H04N 21/4345 | |
| 2019/0058546 A1* | 2/2019 | Jeong | H03M 13/1165 | |
| 2019/0068314 A1* | 2/2019 | Park | H04L 1/0008 | |

(56) References Cited

U.S. PATENT DOCUMENTS

OTHER PUBLICATIONS

Communication dated Oct. 21, 2016, issued by the International Searching Authority in counterpart International Application No. PCT/KR2016/008002 (PCT/ISA/210 & PCT/ISA/237).

* cited by examiner

FIG. 11

FIRST_SUB_FFT_SIZE
FIRST_SUB_GUARD_INTERVAL
FIRST_SUB_PAPR
FIRST_SUB_SP_PATTERN
FIRST_SUB_SBS_FIRST
FIRST_SUB_SBS_LAST
FIRST_SUB_OFDM_SYMBOL
FIRST_SUB_NOC
FIRST_SUB_EXCESS_CP

TRANSMITTING APPARATUS, RECEIVING APPARATUS, AND CONTROL METHODS THEREOF

CROSS-REFERENCE TO THE RELATED APPLICATIONS

This application is a Continuation of U.S. patent application Ser. No. 15/959,484 filed Apr. 23, 2018, which is a Continuation of U.S. patent application Ser. No. 15/217,241 filed Jul. 22, 2016, issued as U.S. Pat. No. 9,954,917 on Apr. 24, 2018, which claims priority from U.S. Provisional Patent Application No. 62/195,883, filed on Jul. 23, 2015, in the United States Patent and Trademark Office, and Korean Patent Application No. 10-2016-0087975, filed on Jul. 12, 2016, in the Korean Intellectual Property Office, the disclosures of which are incorporated herein by references in their entirety.

BACKGROUND

1. Field of the Invention

Apparatuses and methods consistent with the exemplary embodiments of the present inventive concept relate to a transmitting apparatus, a receiving apparatus, and control methods thereof, and more particularly, to a transmitting apparatus that maps data onto at least one signal processing path and transmits the mapped data, a receiving apparatus, and control methods thereof.

2. Description of the Related Art

In the information-oriented society of the 21st century, broadcasting communication services are entering an era of digitization, multi-channel, broadband, and high quality. In particular, as high-quality digital televisions (TVs), portable multimedia players (PMP), and portable broadcasting apparatuses have been increasingly used in recent years, even in digital broadcasting services, a demand for supporting various receiving methods has been increased.

Thus, the broadcasting communication standard group has established various standards according to demands to provide various services to satisfy user's needs. Still, however, it is required to find methods for providing better services having improved performance.

SUMMARY

Exemplary embodiments of the inventive concept may overcome the above disadvantages and other disadvantages not described above. Also, the exemplary embodiments of the inventive concept are not required to overcome the disadvantages described above, and may not overcome any of the problems described above.

The exemplary embodiments provide a transmitting apparatus that provides a preamble including various types of information, a receiving apparatus, and control methods thereof.

According to an exemplary embodiment, there is provided a transmitting apparatus which may include: an L1 signaling generator configured to generate L1 signaling including first information and second information; a frame generator configured to generate a frame including a payload including a plurality of sub frames; and a signal processor configured to insert a preamble including the L1 signaling in the frame and transmit the frame. The first information may include information required for decoding a first sub frame among the plurality of sub frames.

According to an exemplary embodiment, there is provided a receiving apparatus which may include: a receiver configured to receive a frame including a preamble including L1 signaling including first information and second information and a payload including a plurality of sub frames; and a signal processor configured to signal-process the frame. The first information may include information required for decoding a first sub frame of the plurality of sub frames, and the signal processor may decode the first sub frame based on the information included in the first information and decode the second information in parallel with the decoding the first sub frame.

According to an exemplary embodiment, there is provided a method of controlling a transmitting apparatus. The method may include: generating L1 signaling including first information and second information; generating a frame including a payload including a plurality of sub frames; and inserting a preamble including the L1 signaling in the frame and transmitting the frame. The first information may include information for decoding a first sub frame of the plurality of sub frames.

According to an exemplary embodiment, there is provided a method of controlling a receiving apparatus. The method may include: receiving a frame including a preamble including L1 signaling including first information and second information and a payload including a plurality of sub frames; and signal-processing the frame. The signal-processing of the frame may include decoding a first sub frame based on information included in the first information and decoding the second information in parallel with the decoding the first sub frame.

According to various exemplary embodiments, a processing delay in a receiving apparatus may be reduced.

Additional and/or other aspects and advantages of the invention will be set forth in part in the description which follows and, in part, will be obvious from the description, or may be learned by practice of the exemplary embodiments.

BRIEF DESCRIPTION OF THE DRAWINGS

The above and/or other aspects of the exemplary embodiments will be described with reference to the accompanying drawings, in which:

FIG. 11 is a diagram illustrating information included in L1 basic according to an exemplary embodiment;

DETAILED DESCRIPTION OF THE EXEMPLARY EMBODIMENTS

Hereinafter, various exemplary embodiments of the inventive concept will be described in detail with reference to the accompanying drawings. Further, in the following description, a detailed explanation of known related functions or configurations may be omitted to avoid unnecessarily obscuring the subject matter. In addition, terms to be described below may vary according to a user's and an operator's intentions, the convention, or the like as terms defined by considering functions. Therefore, the definition may be made according to the contents throughout this specification.

An apparatus and a method proposed in the exemplary embodiments may be, of course, applied to various communication systems including mobile broadcasting services including a digital multimedia broadcasting (DMB) service, digital video broadcasting handheld (DVB-H), an advanced television systems committee mobile/handheld (ATSC-M/H) service, an Internet protocol television (IPTV) service, and the like, communication systems including a moving picture experts group (MPEG) media transport (MMT) system, an evolved packet system (EPS), a long-term evolution (LTE) mobile communication system, a long-term evolution-advanced (LTE-A) mobile communication system, a high speed downlink packet access (HDSPA) mobile communication system, a high speed uplink packet access (HSUPA) mobile communication system, a $3^{rd}$ generation project partnership 2 (3GPP2) high rate packet data (HRPD) mobile communication system, a 3GPP2 wideband code division multiple access (WCDMA) mobile communication system, a 3GPP2 code division multiple access (CDMA) mobile communication system, an Institute of Electrical and Electronics Engineers (IEEE) 802.16m communication system, a mobile Internet protocol (Mobile IP) system, and the like.

Figure 1:
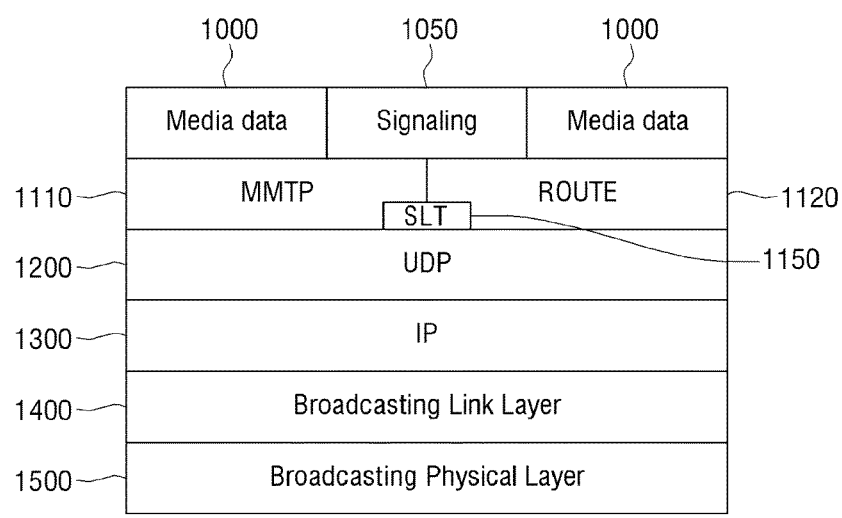
FIG. 1 is a diagram illustrating a hierarchical structure of a transmitting system according to an exemplary embodiment.

FIG. 1 is a diagram illustrating a hierarchical structure of a transmitting system according to an exemplary embodiment.

Referring to FIG. 1, a service includes media data 1000 and signaling 1050 for transferring information required to acquire and consume the media data 1000 at a receiver. The media data 1000 may be encapsulated in a format suitable for transmission prior to the transmission. An encapsulation method may follow a Media Processing Unit (MPU) defined in ISO/IEC 23008-1 MPEG Media Transport (MMT) or a DASH segment format defined in ISO/IEC 23009-1 Dynamic Adaptive Streaming over HTTP (DASH). The media data 1000 and the signaling 1050 are packetized according to an application layer protocol.

FIG. 1 illustrates a case in which an MMT protocol (MMTP) 1110 defined in the MMT and a Real-Time Object Delivery over Unidirectional Transport (ROUTE) protocol 1120 are used as the application layer protocol. In this case, a method for notifying information about an application protocol, in which a service is transmitted, by an independent method different from the application layer protocol is required for the receiver to know by which application layer protocol the service is transmitted.

A service list table (SLT) 1150 illustrated in FIG. 1 represents or indicates a signaling method and packetizes information about the service in a table for satisfying the aforementioned object. Detailed contents of the SLT will be described below. The packetized media data and the signaling including the SLT are transferred to a broadcasting link layer 1400 through a user datagram protocol (UDP) 1200 and an Internet protocol (IP) 1300. An example of the broadcasting link layer 1400 includes an ATSC 3.0 link-layer protocol (ALP) defined in the ATSC 3.0 standard (hereafter, referred to as 'ATSC 3.0'). The ALP protocol generates an ALP packet by using an IP packet as an input, and transfers the ALP packet to a broadcasting physical layer 1500.

However, according to FIG. 2 to be described below, it is noted that the broadcasting link layer 1400 does not use only the IP packet 1300 including the media data and/or the signaling as the input, and instead, may use an MPEG2-TS packet or general formatted packetized data as the input. In this case, signaling information required to control the broadcasting link layer is also transferred to the broadcasting physical layer 1500 in the form of the ALP packet.

The broadcasting physical layer 1500 generates a physical layer frame by signal-processing the ALP packet as the input, converts the physical layer frame into a radio signal, and transmits the radio signal. In this case, the broadcasting physical layer 1500 has at least one signal processing path. An example of the signal processing path may include a physical layer pipe (PLP) of ATSC 3.0 or the Digital Video Broadcasting-Second Generation Terrestrial (DVB-T2) standard, and one or more services or some of the services may be mapped to the PLP.

Figure 2:
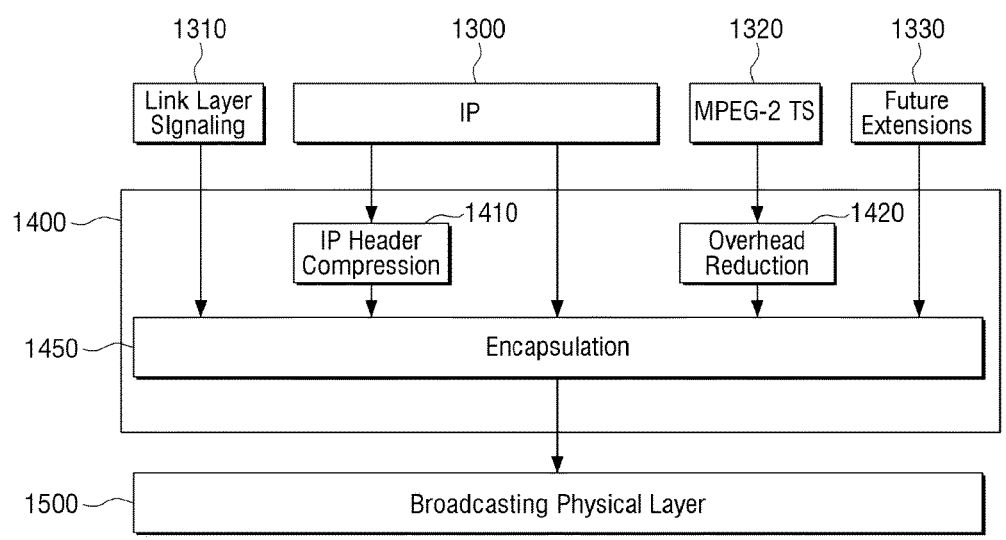
FIG. 2 is a diagram illustrating a schematic configuration of a broadcasting link layer 1400 according to an exemplary embodiment.

FIG. 2 is a diagram illustrating a schematic configuration of the broadcasting link layer 1400, according to an exemplary embodiment.

Referring to FIG. 2, the input of the broadcasting link layer 1400 includes the IP packet 1300, and may further include link layer signaling 1310, an MPEG2-TS packet 1320, and other packetized data 1330.

Input data may be subjected to additional signal processing based on the type of the input data before ALP packetization 1450. As an example of the additional signal processing, the IP packet 1300 may be subjected to an IP header compression process 1410 and the MPEG2-TS packet may be subjected to an overhead reduction process 1420. During the ALP packetization, input packets may be subjected to dividing and merging processes.

Figure 3A:
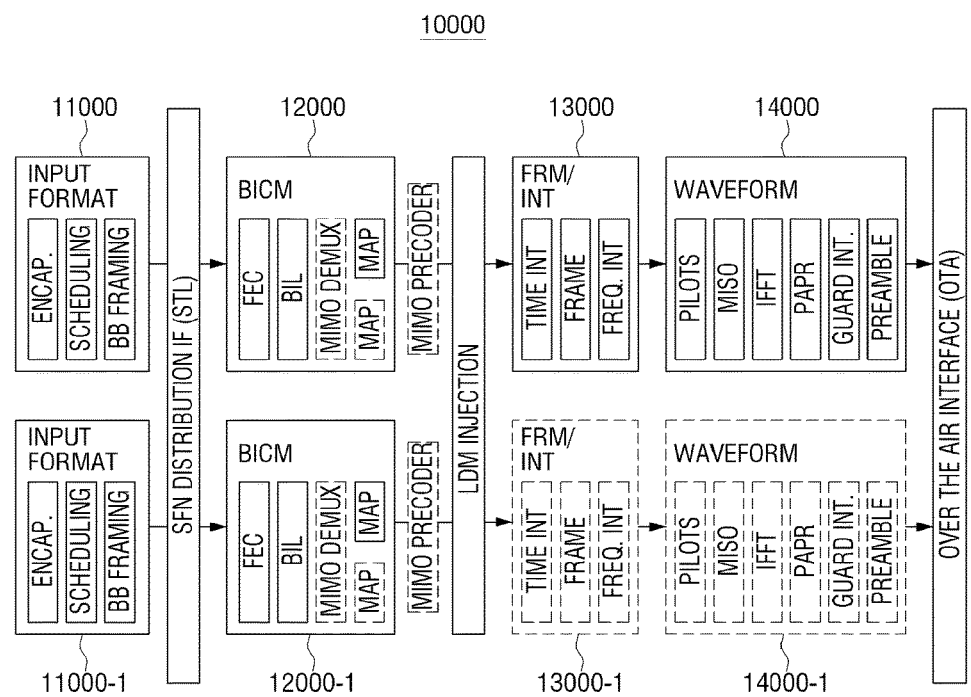
FIG. 3A is a diagram illustrating a schematic configuration of a transmitting system (or a transmitting apparatus) according to an exemplary embodiment.

FIG. 3A is a diagram illustrating a schematic configuration of a transmitting system or a transmitting apparatus, according to an exemplary embodiment. According to FIG. 3A, a transmitting system 10000 according to the exemplary embodiment may include input formatting blocks 11000 and 11000-1, bit interleaved and coded modulation (BICM) blocks 12000 and 12000-1, framing/interleaving blocks 13000 and 13000-1, and waveform generation blocks 14000 and 14000-1.

The input formatting blocks 11000 and 11000-1 generate a baseband packet from an input stream of data to be serviced. Herein, the input stream may be a transport stream (TS), Internet packets (IP) (e.g., IPv4 and IPv6), an MPEG media transport (MMT), a generic stream (GS), generic stream encapsulation (GSE), and the like. For example, an ALP packet may be generated based on the input stream, and the baseband packet may be generated based on the generated ALP packet.

The bit interleaved and coded modulation (BICM) blocks 12000 and 12000-1 determine an forward error correction (FEC) coding rate and a constellation order according to an area (fixed PHY frame or mobile PHY frame) to which the data to be serviced will be transmitted, and perform encoding and time interleaving. Meanwhile, signaling information about the data to be serviced may be encoded through a separate BICM encoder according to user implementation or encoded by sharing a BICM encoder with the data to be serviced.

The framing/interleaving blocks 13000 and 13000-1 combine the time-interleaved data with a signaling signal including the signaling information to generate a transmission frame.

The waveform generation blocks 14000 and 14000-1 generate an orthogonal frequency-division multiplexing (OFDM) signal in a time domain for the generated transmission frame, modulate the generated OFDM signal into an RF signal, and transmit the RF signal to a receiver.

The transmitting system 10000 according to the exemplary embodiment illustrated in FIG. 3A includes normative blocks marked with a solid line and informative blocks marked with dotted lines. Herein, the blocks marked with the solid line are normal blocks, and the blocks marked with the dotted lines are blocks which may be used when informative multiple-input multiple-output (MIMO) is implemented.

Figure 3B:
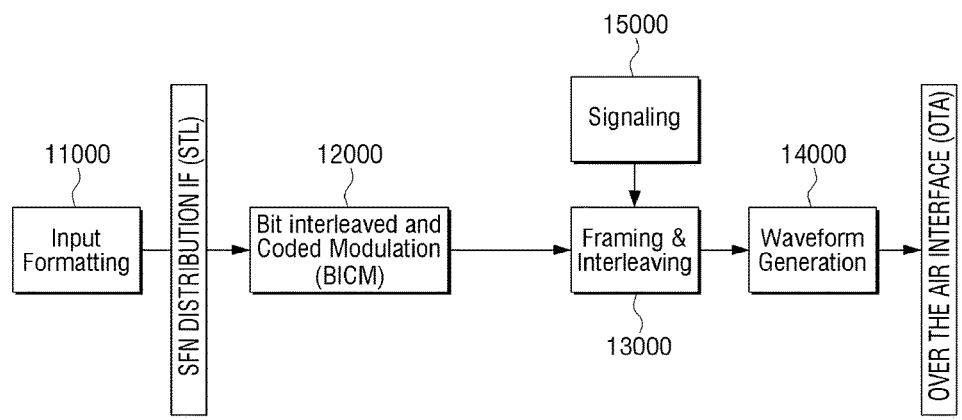
FIGS. 3B and 3C are diagrams illustrating a multiplexing method, according to exemplary embodiments.
Figure 3C:
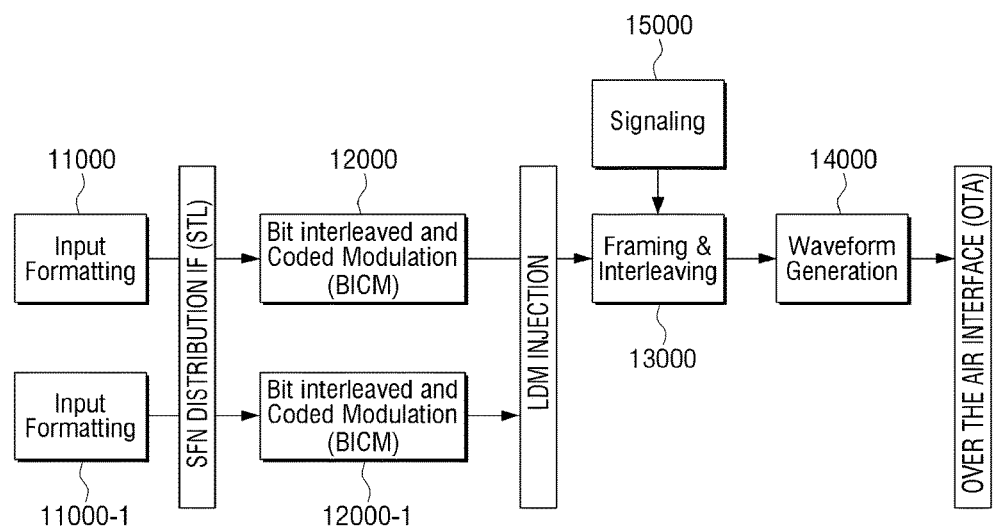

FIGS. 3B and 3C are diagrams illustrating a multiplexing method, according to exemplary embodiments.

FIG. 3B illustrates a block diagram for implementing time division multiplexing (TDM), according to an exemplary embodiment.

A TDM system architecture includes four main blocks (alternatively, parts) of the input formatting block 11000, the BICM block 12000, the framing/interleaving block 13000, and the waveform generation block 14000.

Data is input and formatted in the input formatting block 11000 and forward error correction is applied to the data in the BICM block 12000. Next, the data is mapped to a constellation. Subsequently, the data is time and frequency-interleaved in the framing/interleaving block 13000 and a frame is generated. Thereafter, an output waveform is generated in the waveform generation block 14000.

FIG. 3C illustrates a block diagram for implementing layered division multiplexing (LDM), according to an exemplary embodiment.

An LDM system architecture includes several other blocks as compared with the TDM system architecture. In detail, two separated input formatting blocks 11000 and 11000-1 and the BICM blocks 12000 and 12000-1 for one of respective layers of the LDM are included in the LDM system architecture. The blocks are combined in an LDM injection block before the framing/interleaving block 13000. And, the waveform generation block 14000 is similar to the TDM.

Figure 4:
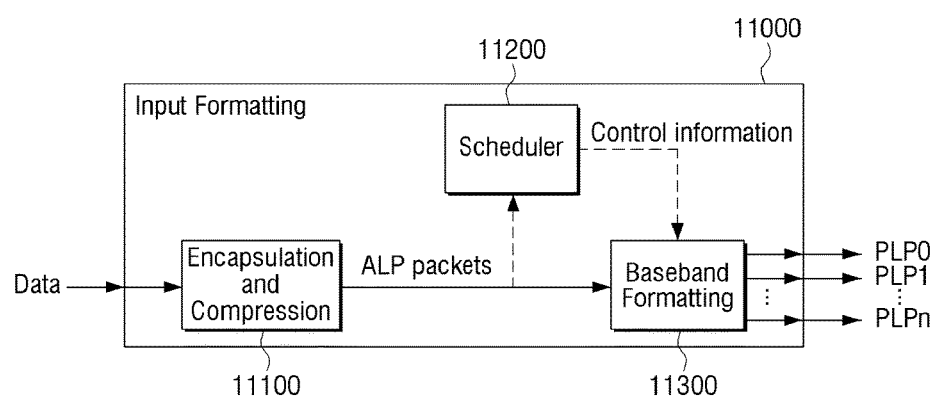
FIG. 4 is a block diagram illustrating a detailed configuration of an input formatting block of FIG. 3A, according to an exemplary embodiment.

FIG. 4 is a block diagram illustrating a detailed configuration of the input formatting block illustrated in FIG. 3A, according to an exemplary embodiment.

As illustrated in FIG. 4, the input formatting block 11000 includes three blocks that control packets distributed to PLPs. In detail, the input formatting block 11000 includes an encapsulation and compression block 11100, a baseband formatting block (alternatively, baseband framing block) 11300, and a scheduler block 11200.

An input stream input to the encapsulation and compression block 11100 may be various types. For example, the input stream may be a transport stream (TS), an Internet packets (IP) (e.g., IPv4 and IPv6), an MPEG media transport (MMT), a generic stream (GS), a generic stream encapsulation (GSE), and the like.

Packets output from the encapsulation and compression block 11100 become ALP packets (generic packets) (also referred to as L2 packets). Herein, a format of an ALP packet may be one of the Type Length Value (TLV), the GSE, and the ALP.

The length of each ALP packet is variable. The length of the ALP packet may be easily extracted from the ALP packet itself without additional information. The maximum length of the ALP packet is 64 kB. The maximum length of a header of the ALP packet may be 4 bytes. The ALP packet has a length of integer bytes.

The scheduler block 11200 receives an input stream including the encapsulated ALP packets to form physical layer pipes (PLPs) in a baseband packet form. In the TDM system, only one PLP called a single PLP (S-PLP) or multiple PLPs (M-PLP) may be used. One service may not use four or more PLPs. In the LDM system constituted by two layers, one in each layer, that is, two PLPs are used.

The scheduler block 11200 receives the encapsulated ALP packets to designate how the encapsulated ALP packets are allocated to physical layer resources. In detail, the scheduler block 11200 designates how the baseband formatting block 1130 outputs a baseband packet.

A function of the scheduler block 11200 is defined by a data size and a time. A physical layer may transmit some of data in the distributed time. The scheduler block generates a solution which is suitable in terms of a configuration of a physical layer parameter by using inputs and information such as constraints and configuration from an encapsulated data packet, the quality of service metadata for the encapsulated data packet, a system buffer model, and system management. The solution is targets of a configuration and a control parameter which are usable and an aggregate spectrum.

Meanwhile, an operation of the scheduler block 11200 is constrained to a set of dynamic, quasi-static, and static components. Definition of the constraint may vary according to user implementation.

Further, a maximum of four PLPs may be used with respect to each service. A plurality of services which include a plurality of types of interleaving blocks may be implemented by up to a maximum of 64 PLPs with respect to a bandwidth of 6, 7, or 8 MHz.

Figure 5A:
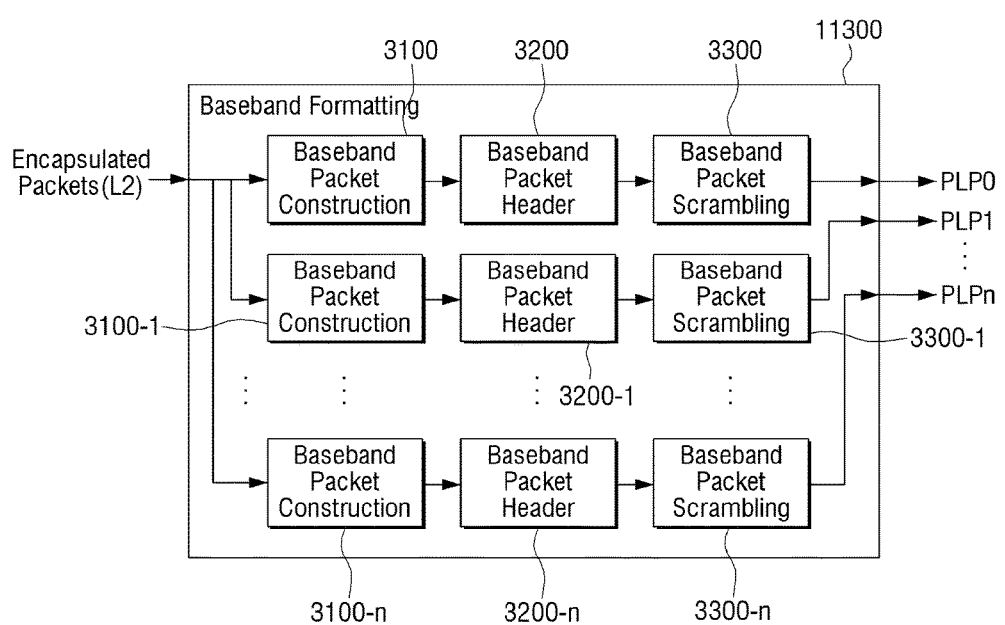
FIGS. 5A and 5B are diagrams illustrating a detailed configuration of a baseband formatting block, according to exemplary embodiments.

The baseband formatting block 11300 includes baseband packet construction blocks 3100, 3100-1, . . . , and 3100-n, baseband packet header construction blocks 3200, 3200-1, . . . , and 3200-n, and baseband packet scrambling blocks 3300, 3300-1, . . . , and 3300-n, as illustrated in FIG. 5A. In an M-PLP operation, the baseband formatting block generates a plurality of PLPs as necessary.

Figure 5B:
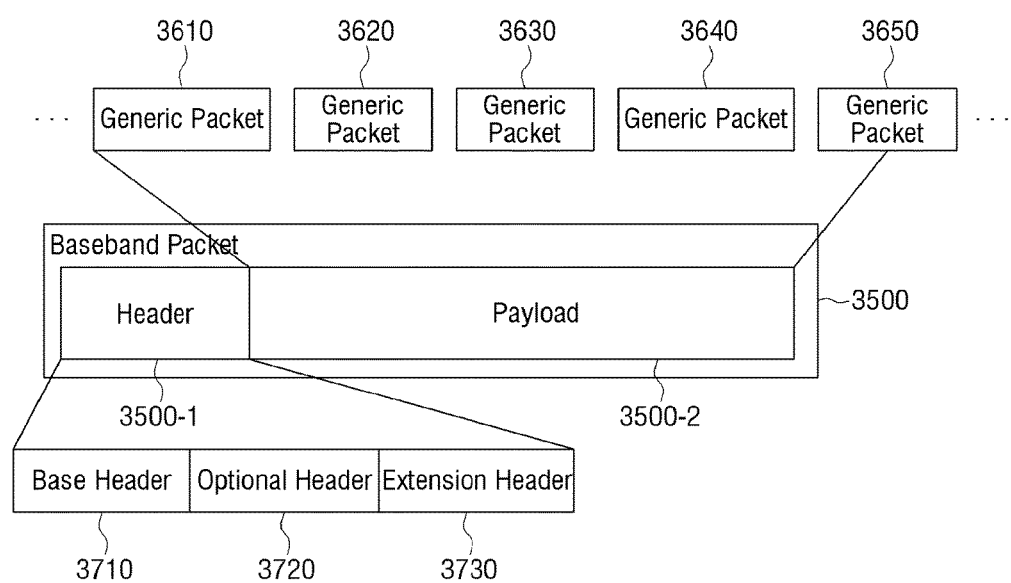

The baseband packet construction blocks 3100, 3100-1, . . . , and 3100-n construct baseband packets. Each baseband packet 3500 includes a header 3500-1 and a payload 3500-2 as illustrated in FIG. 5B. A baseband packet is fixed to a length Kpayload. ALP packets 3610 to 3650 are sequentially mapped to a baseband packet 3500. When the ALP packets 3610 to 3650 do not completely fit in the baseband packet 3500, these packets are distributed between a current baseband packet and a next baseband packet. The ALP packets are distributed in a unit of a byte.

The baseband packet header construction blocks 3200, 3200-1, . . . , and 3200-n construct a header 3500-1. The header 3500-1 includes three parts, that is, a base field (also referred to as a base header) 3710, an optional field (also referred to as an option header) 3720, and an extension field (also referred to as an extension header) 3730, as illustrated in FIG. 5B. Herein, the base field 3710 is shown in every baseband packet and the optional field 3720 and the extension field 3730 may not be shown in every baseband packet.

A main function of the base field 3710 provides a pointer of an offset value as bytes to indicate a start of a next ALP packet in a baseband packet. When an ALP packet starts a baseband packet, the value of the pointer becomes 0. When there is no ALP packet that starts in the baseband packet, the value of the pointer may be 8191 and a base header of 2 bytes may be used.

The extension field 3730 may be used afterwards and for example, used for a baseband packet counter, baseband packet time stamping, additional signaling, and the like.

The baseband packet scrambling blocks 3300, 3300-1, . . . , and 3000-n scramble the baseband packet.

As in a case where payload data mapped to constellations include repetitive sequences, the payload data is scrambled at all times before direction error correction encoding, so as not to be always mapped at the same point.

Figure 6:
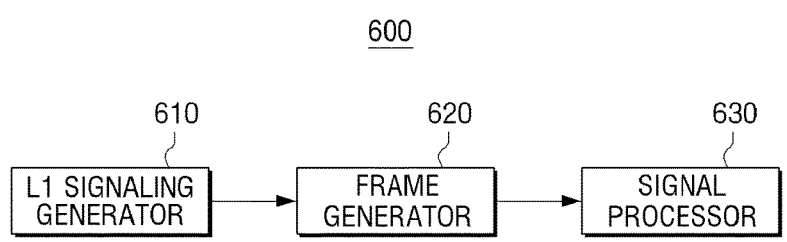
FIG. 6 is a block diagram illustrating a configuration of a transmitting apparatus according to an exemplary embodiment of the present invention.

FIG. 6 is a block diagram illustrating a configuration of a transmitting apparatus 600, according to an exemplary embodiment.

Referring to FIG. 6, the transmitting apparatus 600 includes an L1 signaling generator 610, a frame generator 620, and a signal processor 630.

The L1 signaling generator 610 generates L1 signaling. The L1 signaling generator 610 corresponds to a signaling unit 15000 illustrated in FIG. 3B. Also, as described above, L1 signaling may be encoded through an additional BICM encoder or the BCIM encoder which is for encoding data to be serviced. In particular, the L1 signaling includes a plurality of PLPs included in a payload configuring a frame or information about a data symbol.

In detail, the L1 signaling generator 610 generates the L1 signaling including first information and second information.

Here, as described above, the L1 signaling includes information about the plurality of PLPs included in the payload configuring the frame or information about the data symbol, and may include L1 basic and L1 detail.

Herein, the first information and the second information configuring the L1 signaling will be described as respectively corresponding to the L1 basic and the L1 detail.

Also, the frame generator 620 generates a frame including a payload including a plurality of sub frames. In detail, the frame includes a bootstrap (BS), a preamble, and a payload. The BS includes information for processing an OFDM symbol included in the preamble, and the preamble includes information for processing the OFDM symbol included in the payload. Here, the frame generator 620 corresponds to a framing/interleaving block 13000 of FIG. 3B.

Also, the signal processor 630 includes the preamble including the L1 signaling in the frame and then transmits the frame including the preamble. Here, the signal processor 630 corresponds to a waveform generation block 14000 of FIG. 3B.

In detail, a configuration of the frame will now be described in detail.

Figure 7:
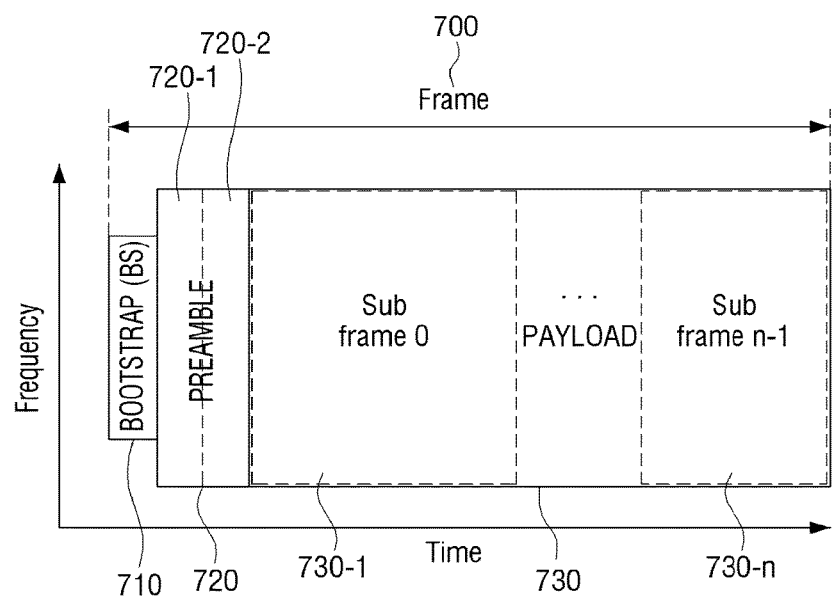
FIG. 7 is a diagram illustrating a configuration of a frame that is a base for describing the exemplary embodiments.

FIG. 7 is a diagram illustrating a configuration of the frame 700 that is a base for describing the present invention.

Referring to FIG. 7, the frame 700 may be represented as a combination of three basic components. In detail, the frame 700 may include a BS 710 located at a start part of each frame, a preamble 720 located next to the BS 710, and a payload 730 located next to the preamble 720.

Here, the preamble 720 includes L1 signaling to be used for processing data included in the payload 730.

Also, the payload 730 includes at least one sub frames 730-1, . . . , and 730-n. If a plurality of sub frames exist in the payload 730, the plurality of sub frames are connected to one another to be arranged based on a time axis illustrated in FIG. 7.

Each of the sub frames 730-1, . . . , and 730-n has a Fast Fourier Transform (FFT) size, a GI length, a scattered pilot pattern, and the number of effective carriers. The FFT size, the GI length, the scattered pilot pattern, and the number of effective carriers are not changed in the same sub frame. However, FFT sizes, GI lengths, scattered pilot patterns, and the numbers of effective carriers may be different between different sub frames 730-1, . . . , and 730-n of the frame 700.

In particular, the BS 710 may include a sync symbol located at a start part of each frame to detect signals, precisely synchronize the signals with one another, estimate a frequency offset, and perform an initial channel estimation.

Also, the BS 710 may include control signaling required for receiving and decoding the other parts (i.e., the preamble 720 and the payload 730) excluding the BS 710 from the frame 700.

In detail, the BS 710 uses a fixed sampling rate of 6.144 Ms/sec and a fixed bandwidth of 4.5 Mhz regardless of a channel bandwidth used for the other parts except the BS 710.

The preamble 720 includes L1 basic 720-1 and L1 detail 720-2. In detail, the L1 basic 720-1 includes information about an FEC-type required for decoding the L1 detail 720-2, the number of symbols included in the preamble 720, a length of the L1 detail 720-2, and the like.

Also, the L1 detail 720-2 includes information about the number of sub frames 730-1, . . . , and 730-n included in the payload 730, mod/cod (modulation/code rate) of symbols included in each of the sub frames 730-1, . . . , and 730-n, and the like.

Here, the L1 basic 720-1 according to the exemplary embodiment includes information required for decoding a first sub frame among a plurality of sub frames 730-1 . . . , and 730-n.

In contrast, the L1 detail 720-2 includes information required for decoding the other sub frames except the first sub frame among the plurality of sub frames 730-1, . . . , and 730-n.

Figure 8:
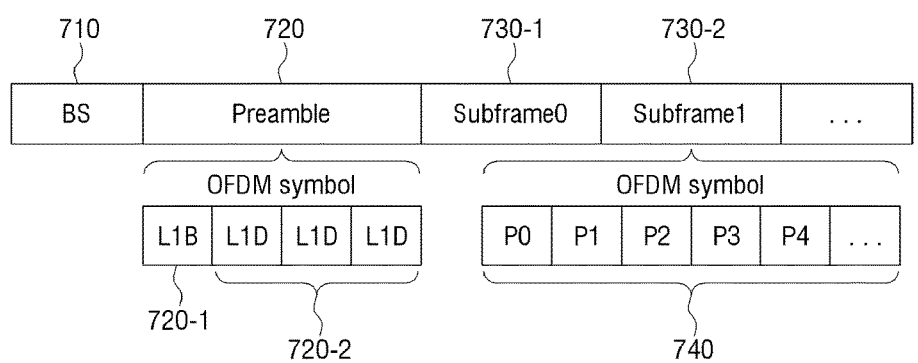
FIG. 8 is a diagram illustrating a detailed configuration of the frame of FIG. 7, according to an exemplary embodiment.

FIG. 8 is a diagram illustrating a configuration of the frame 700 of FIG. 7 in detail.

Referring to FIG. 8, the frame 700 includes the BS 710, the preamble 720, and a plurality of sub frames 730-1, 730-2, . . . configuring the payload 730. The preamble 720 may include one L1 basic (L1B) 720-1 and one or more L1 details (L1D) 720-2, and each of the sub frames 730-1, 730-2, . . . may include a plurality of data symbols 740.

Here, the L1 basic 720-1 includes information required for decoding the first sub frame 730-1 among the plurality of sub frames 730-1, 730-2, . . . .

For example, if the first sub frame 730-1 of the plurality of sub frames 730-1, 730-2, . . . includes 10 data symbols from P0 to P9, and the second sub frame 730-2 includes 10 data symbols from P10 to P19, the L1 basic 720-1 includes information required for decoding 10 data symbols from P0 to P9.

Also, the L1 detail 720-2 includes information required for decoding the other sub frames 730-2, . . . except the first sub frame 730-1 among the plurality of sub frames 730-1, 730-2, . . . .

For example, if the first sub frame 730-1 among the plurality of sub frames 730-1, 730-2, . . . includes 10 data symbols from P0 to P9, and the second sub frame 730-2 includes 10 data symbols from P10 to P19, the L1 detail 720-2 includes information required for decoding 10 data symbols from P10 to P19 included in the second sub frame 730-2 except the first sub frame 730-1.

Even if a third sub frame, a fourth sub frame, or the like exists, the L1 detail 720-2 may include information required for decoding data symbols included in the third sub frame, the fourth sub frame, or the like.

As described above, the L1 signaling generator 610 of the transmitting apparatus 600 generates L1 signaling including the L1 basic 720-1 including information required for decoding the first sub frame 730-1 among a plurality of sub frames and the L1 detail 720-1 including information required for decoding the other sub frames 730-2, . . . except the first sub frame 730-1 among the plurality of sub frames. If the signal processor 630 includes a preamble including the L1 signaling in a frame, and then, transmits the preamble to a receiver, the receiver is capable of accelerating a start time for decoding a payload included in the frame by using information required for decoding the first sub frame 730-1 among a plurality of sub frames included in the L1 basic 720-1. This will now be described in detail with reference to FIGS. 9 and 10.

Figure 9:
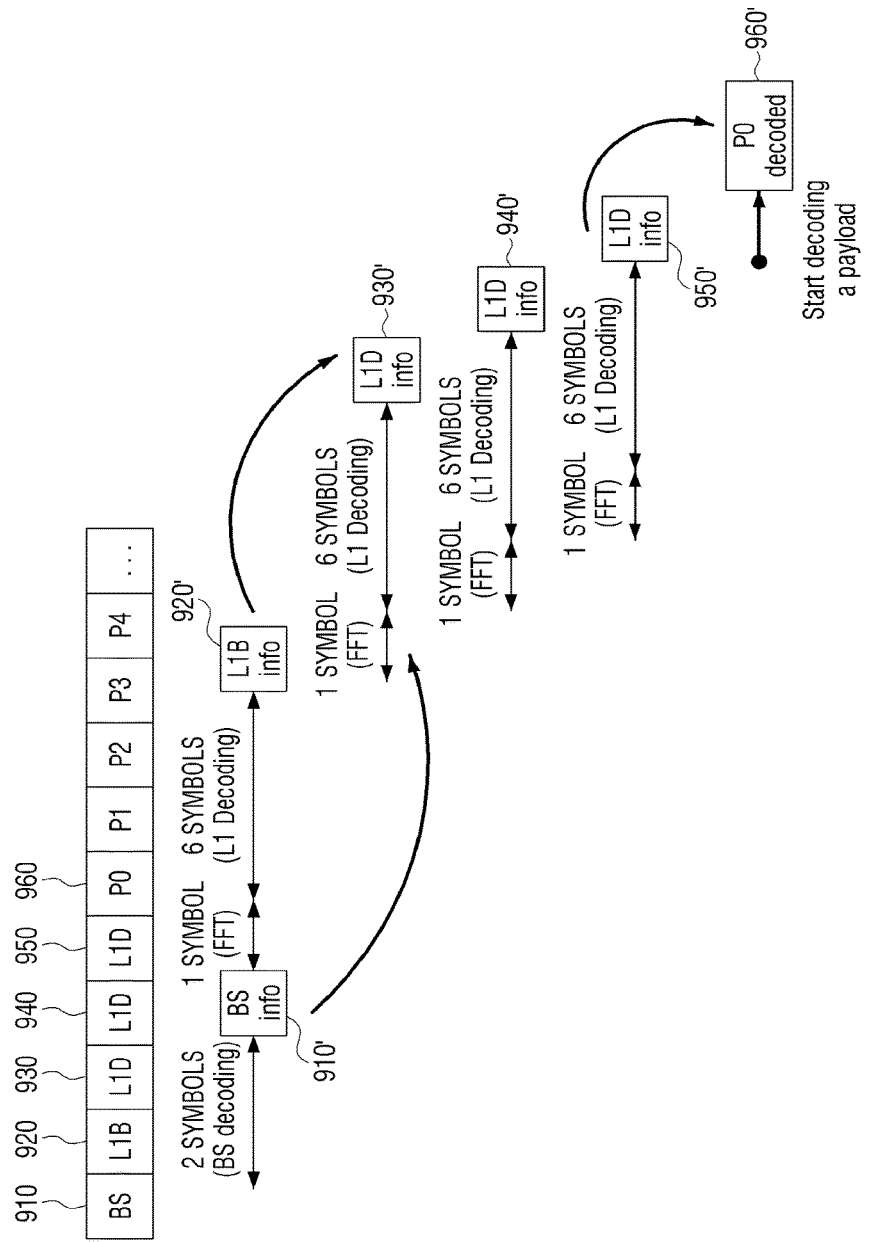
FIG. 9 is a diagram illustrating a start time for decoding a related art payload.

FIG. 9 is a diagram illustrating a start time for decoding a related art payload.

Referring to FIG. 9, if a receiver receives a frame including a payload including a BS 910, L1 basic (L1B) 920, three L1 details (L1Ds) 930, 940, and 950, P1, P2, P3, P4, . . . , a time corresponding to 2 symbols (BS decoding) is delayed to decode the BS 910 to detect information 910' for decoding the L1B 920 included in the BS 910; and a time corresponding to 1 symbol (FFT) and 6 symbols (L1B decoding), i.e., 7 symbols, is delayed to decode the L1B 920 to detect information 920' for decoding the L1Ds 930, 940, and 950.

Also, to respectively decode the L1Ds 930, 940, and 950 to detect information 930', 940', and 950' for decoding payloads included in the L1Ds 930, 940, and 950, a time corresponding to approximately 6 symbols (first L1D decoding) is delayed to decode the first L1D 930, and a time corresponding to approximately a total of 2 symbols (second L1D FFT and third L1D FFT) is delayed to perform FFT with respect to the second L1D 940 and the third L1D 950.

Thus, when a frame is received, a receiver may start decoding the first data symbol P0 960 after a time, corresponding to approximately 17 symbols, which is a sum of a time corresponding to 2 symbols (BS decoding) delayed to decode the BS 910 to detect information 910' for decoding the L1B 920 included in the BS 910, a time corresponding to 1 symbol (FFT) and 6 symbols (L1 basic decoding) delayed to decode the L1B 920 to detect information 920' for decoding the L1Ds 930, 940, and 950 included in the L1B 920, a time corresponding to 6 symbols (first L1D decoding) delayed for decoding the first L1D 930, and a time corresponding to a total of 2 symbols (second L1D FFT and third L1D FFT) delayed for performing FFT with respect to the second L1D 940 and the third L1D 950. Only when all of the L1Ds 930, 940, and 950 are completely decoded, P0 decoding 960' may be completed based on information required for decoding the first data symbol P0 960.

Therefore, the receiver may be able to start decoding a first data symbol included in a payload after a time corresponding to approximately 17 symbols has passed from a time when the frame is received.

Figure 10:
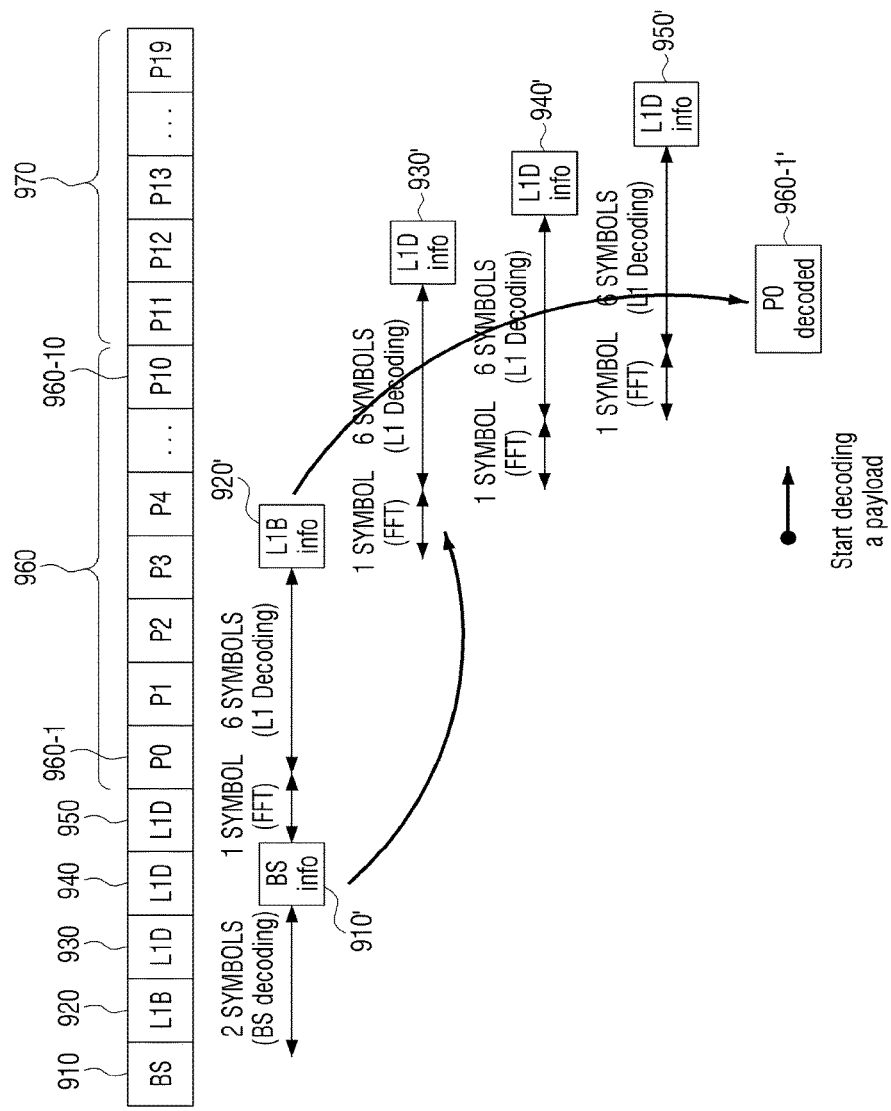
FIG. 10 is a diagram illustrating a start time for decoding a payload according to an exemplary embodiment.

FIG. 10 is a diagram illustrating a start time for decoding a payload according to an exemplary embodiment.

Referring to FIG. 10, a frame according to an exemplary embodiment, for example, includes a payload including a BS 910, L1B 920, three L1Ds 930, 940, and 950, a first sub frame 960 including a plurality of data symbols P0 960-1, P1, P2, P3, P4, . . . , and P10 960-10, and a second sub frame 970 including a plurality of data symbols P11, P12, P13, . . . , and P19.

Here, as described above, the L1B 920 includes information for decoding the first sub frame 960. In detail, the L1B 920 includes information for decoding P0 960-1, P1, P2, P3, P4, . . . , and P10 960-10 included in the first sub frame 960.

Also, if such a frame is received by a receiver, a time corresponding to 2 symbols (BS decoding) is delayed to decode the BS 910 to detect information 910' for decoding the L1B 920 included in the BS 910, and a time corresponding to 1 symbol (FFT) and 6 symbols (L1B decoding), i.e., 7 symbols, is delayed to decode the L1B 920 to detect information 920' for decoding L1Ds 930, 940, and 950 included in the L1B 920 at the receiver.

Here, the L1B 920 includes information for decoding the first sub frame 960. Therefore, if decoding of the L1B 920 is completed, and thus information for decoding the first sub frame 960 included in the L1B 920 is detected, the receiver according to an exemplary embodiment may immediately start decoding the first sub frame 960 without waiting a process of decoding the L1Ds 930, 940, and 950 has been finished. That is, the receiver may perform decoding of the first sub frame 960 without information included in the L1Ds 930, 940, and 950, and complete P0 decoding 960-1' as illustrated in FIG. 10.

As a result, referring to FIG. 10, after delaying a time, corresponding to 9 symbols, which is a sum of a time corresponding to 2 symbols (BS decoding) delayed to detect information 910' for decoding the L1B 920 included in the BS 910, and a time corresponding to 1 symbol (FFT) and 6 symbols (L1B decoding), i.e., 7 symbols, delayed to decode the L1B 920 to detect information 920' for decoding the L1Ds 930, 940, and 950 included in the L1B 920 from a time when a frame is received, the receiver according to the exemplary embodiment may start decoding the first sub frame 960.

Therefore, in comparison between FIGS. 9 and 10, the L1B 920 according to an exemplary embodiment may include information for decoding P0 960-1, P1, P2, P3, P4, . . . , and P10 960-10 included in the first sub frame 960 to reduce a delay by a time corresponding to 8 symbols in comparison with a start time for decoding a payload of the related art, thereby accelerating a start time for decoding a payload.

In other words, according to the exemplary embodiment, a start time for decoding a payload may be accelerated by a time taken for performing FFT with respect to the L1Ds 930, 940, and 950 and decoding the L1Ds 930, 940, and 950.

Therefore, the receiver may reduce a processing delay of a received stream, reduce a capacity of a memory, and easily perform a fast change such as a channel change.

FIG. 11 is a diagram illustrating information included in L1 basic according to an exemplary embodiment.

Referring to FIG. 11, information included in the L1 basic is information for decoding a first sub frame. The information for decoding the first sub frame may be information about an FFT size of the first sub frame, a length of a guard interval, a Peak to Average Power Ratio (PAPR), a scattered pilot pattern, a boundary symbol index, the number of OFDM symbols, the number of effective carriers, and a length of an additional guard interval.

In detail, the information included in the L1 basic may be expressed as FIRST_SUB_FFT_SIZE, FIRST_SUB_GUARD_INTERVAL, FIRST_SUB_PAPR, FIRST_SUB_SP_PATTERN, FIRST_SUB_SBS_FIRST, FIRST_SUB_SBS_LAST, FIRST_SUB_OFDM_SYMBOL, FIRST_SUB_NOC, and FIRST_SUB_EXCESS_CP.

Here, FIRST_SUB_FFT_SIZE refers to the FFT size of the first sub frame, FIRST_SUB_GUARD_INTERVAL refers to the length of the guard interval inserted into the first sub frame, FIRST_SUB_PAPR refers to the PAPR of the first sub frame, FIRST_SUB_SP_PATTERN refers to the scattered pilot pattern inserted into the first sub frame, FIRST_SUB_SBS_FIRST refers to a boundary symbol index inserted into a start end of the first sub frame, FIRST_SUB_SBS_LAST refers to a boundary symbol index inserted into a last end of the first sub frame, FIRST_SUB_OFDM_SYMBOL refers to the number of OFDM symbols inserted into the first sub frame, FIRST_SUB_NOC refers to the number of effective carriers of the first sub frame, and FIRST_SUB_EXCESS_CP refers to the length of the additional guard interval inserted into the first sub frame.

Figure 12:
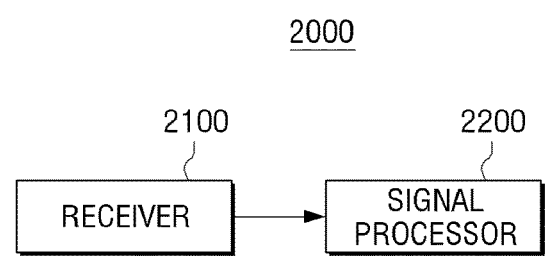
FIG. 12 is a block diagram illustrating a configuration of a receiving apparatus according to an exemplary embodiment.

FIG. 12 is a block diagram illustrating a configuration of a receiving apparatus 2000 according to an exemplary embodiment.

Referring to FIG. 12, the receiving apparatus 2000 includes a receiver 2100 and a signal processor 2200.

The receiver 2100 receives a frame including a preamble including L1 signaling including L1 basic and L1 detail and a payload including a plurality of sub frames. A detailed configuration of the frame has been described with reference to FIG. 7, and thus a detailed description thereof is omitted.

Also, the signal processor 2200 signal-processes the frame.

Here, the L1 basic may include information required for decoding a first sub frame among the plurality of sub frames, and the signal processor 2200 may decode the first sub frame based on the information included in the L1 basic and decode the L1 detail in parallel.

In detail, as described above with reference to FIG. 10, the signal processor 2200 may start decoding the first sub frame 960 based on the information 920' included in the L1B 920, decode the first sub frame 960, and decode the L1Ds 930, 940, and 950 in parallel with the decoding of the first sub frame 960.

Also, the signal processor 2200 completes the decoding of the first sub frame and then decodes the other sub frames except the first sub frame based on the decoded L1 detail.

For example, as described above with reference to FIG. 10, the signal processor 2200 may decode the first sub frame 960 based on the information 920' included in the L1B 920 and decode the L1Ds 930, 940, and 950 in parallel with the decoding of the first sub frame 960. Just when the decoding of the first sub frame 960 is completed, the decoding of the L1Ds 930, 940, and 950 is completed. Therefore, after the decoding of the first sub frame 960 is completed, the signal processor 2200 may start decoding of the other sub frame 970.

Therefore, the signal processor 2200 according to the exemplary embodiment may accelerate a decoding start time of a payload as described above.

Figure 13:
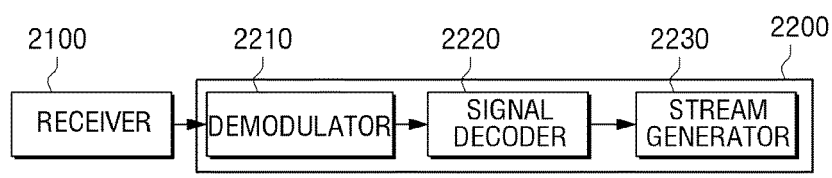
FIG. 13 is a detailed block diagram illustrating a signal processor in detail according to an exemplary embodiment.

FIG. 13 is a block diagram provided to explain in detail a signal processor according to an exemplary embodiment.

Referring to FIG. 13, the signal processor 2200 includes a demodulator 2210, a signal decoder 2220, and a stream generator 2230.

The demodulator 2210 performs demodulation according to OFDM parameters from received RF signals, performs sync-detection, and recognizes whether a currently received frame includes necessary service data when the sync is detected from signaling information stored in a sync area. For example, the demodulator 831 may recognize whether a mobile frame for a mobile receiver is received or a fixed frame for a fixed receiver is received.

In this case, if OFDM parameters are not previously determined regarding a signaling area and a data area, the demodulator 2210 may perform demodulation by obtaining OFDM parameters regarding the signaling area and the data area stored in the sync area, and obtaining information about OFDM parameters regarding the signaling area and the data area which are disposed right after the sync area.

The signal decoder 2220 performs decoding of necessary data. In this case, the signal decoder 2220 may perform decoding by obtaining parameters of an FEC method and a modulating method regarding the data stored in each data area based on the signaling information. Further, the signal decoder 2220 may calculate positions of necessary data based on the data information included in a configurable field and a dynamic field. Thus, it may calculate which positions of the frame a requested PLP is transmitted.

The stream generator 2230 may generate data to be served by processing a baseband packet input from the signal decoder 2220.

For example, the stream generator 2230 may generate an ALP packet from the baseband packet in which errors are corrected based on an ISSY mode, buffer size (BUFS), time to output (TTO) values, and input stream clock reference (ISCR) values.

Specifically, the stream generator 2230 may include de-jitter buffers. The de-jitter buffers may regenerate correct timing to restore an output stream based on the ISSY mode, BUFS, TTO values, and ISCR values. Thereby, a delay for sync between a plurality of PLPs may be compensated.

Figure 14:
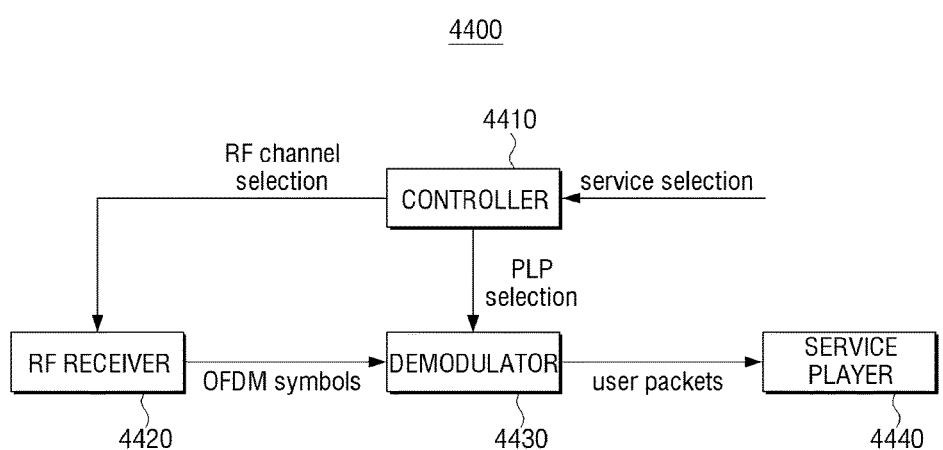
FIG. 14 is a block diagram illustrating a configuration of a receiver according to an exemplary embodiment.

FIG. 14 is a block diagram of a receiving apparatus 4400 according to an exemplary embodiment.

Referring to FIG. 14, the receiving apparatus 4400 may include a controller 4410, an RF receiver 4420, a demodulator 4430, and a service player 4440.

The controller 4410 determines an RF channel and a PLP in which a selected service is transmitted. At this process, the RF channel may be defined by a center frequency and a bandwidth, and the PLP may be defined by a PLP identifier (ID). Certain services may be transmitted through more than one PLP belonging to more than one RF channel per component constituting services. However, it is assumed in the following descriptions that all data required for playing one service is transmitted through one PLP with one RF channel for convenient explanation. Thus, services are provided with a unique data obtaining path to play services, and the data obtaining path is specified by an RF channel and a PLP.

The RF receiver 4420 extracts RF signals from a selected RF channel by the controller 4410, and delivers OFDM symbols, extracted by performing signal-processing of the RF signals, to the demodulator 4430. The signal processing may include synchronization, channel estimation, and equalization. Information required for the signal-processing is predetermined between a transmitting apparatus and the receiving apparatuses or transmitted to the receiving apparatus in a predetermined OFDM symbols among the OFDM symbols.

The demodulator 4430 extracts a user packet by performing signal-processing of the OFDM symbols, and delivers the user packet to the service player 4440. The service player 4440 plays and outputs the service selected by a user with the user packet. A format of the user packet may be different according to implementing services. For example, a TS packet or an IPv4 packet may be the user packet.

Figure 15:
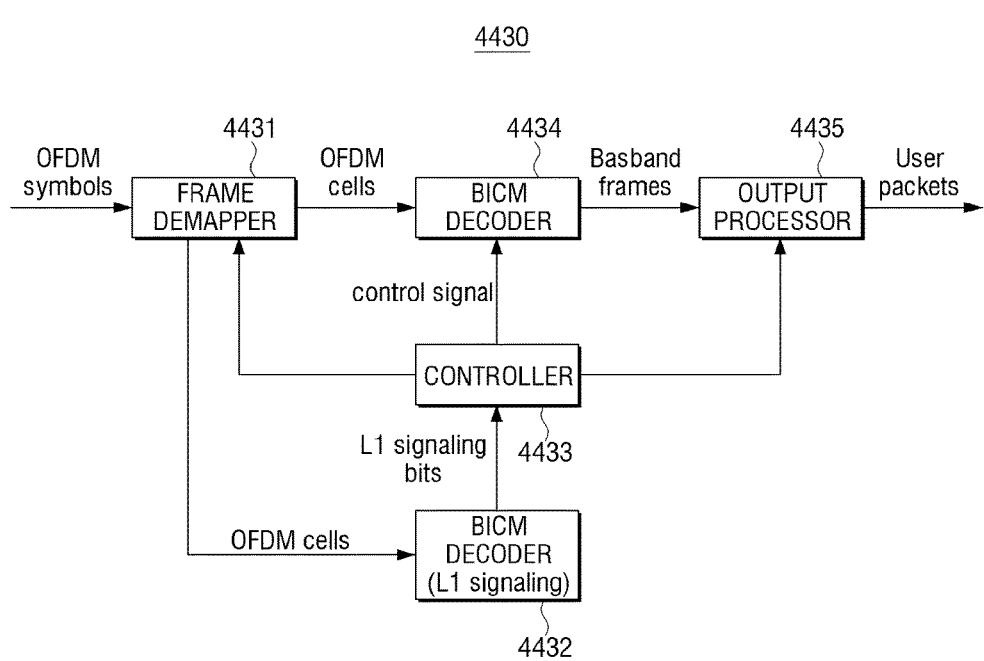
FIG. 15 is a block diagram illustrating a demodulator in more detail according to an exemplary embodiment.

FIG. 15 is a block diagram describing the demodulator 4430 of FIG. 14, according to an exemplary embodiment.

Referring to FIG. 15, the demodulator 4430 may include a frame demapper 4431, a BICM decoder 4432 for L1 signaling, a controller 4433, a BICM decoder 4434, and an output processor 4435.

The frame demapper 4431 selects OFDM cells constituting FEC blocks belonging to a selected PLP from a frame constituted with OFDM symbols based on controlling information delivered from the controller 4433, and delivers the OFDM cells to the decoder 4434. Further, the frame demapper 4431 selects OFDM cells corresponding to more than one FEC block included in the L1 signaling, and delivers the OFDM cells to BICM decoder 4432 for the L1 signaling.

The BICM decoder 4432 for the L1 signaling signal-processes the OFDM cells corresponding to the FEC blocks belonging to the L1 signaling, extracts L1 signaling bits, and delivers the L1 signaling bits to the controller 4433. In this case, the signal-processing may include extracting log-likelihood ratio (LLR) values for decoding low density parity check (LDPC) codes in OFDM cells, and decoding the LDPC codes by using the extracted LLR values.

The controller 4433 extracts an L1 signaling table from the L1 signaling bits, and controls operations of the frame demapper 4431, the BICM decoder 4434, and the output processor 4435 by using values of the L1 signaling table. FIG. 15 illustrates that the BICM decoder 4432 for the L1 signaling does not use controlling information of the controller 4433 for convenient explanation. However, if the L1 signaling includes a layer structure similar to L1 pre-signaling and L1 post-signaling described above, the BICM decoder 4432 for the L1 signaling may be constituted with more than one BICM decoding block, and operations of the BICM decoding blocks and the frame demapper 4431 may be controlled based on upper-layer L1 signaling information, as clearly understood in the above description.

The BICM decoder 4434 signal-processes the OFDM cells constituting FEC blocks belonging to the selected PLP, extracts baseband packets, and delivers the baseband packets to the output processor 4435. The signal-processing may include extracting LLR values for coding and decoding LDPC codes in OFDM cells, and decoding the LDPC codes by using the extracted LLR values. These two operations may be performed based on the controlling information delivered from the controller 4433.

The output processor 4435 signal-processes the baseband packets, extracts a user packet, and delivers the extracted user packet to the service player. In this case, the signal-processing may be performed based on the controlling information delivered from the controller 4433.

According to an exemplary embodiment, the output processor 1235 may include an ALP packet processor (not illustrated) which extracts an ALP packet from a baseband packet.

Figure 16:
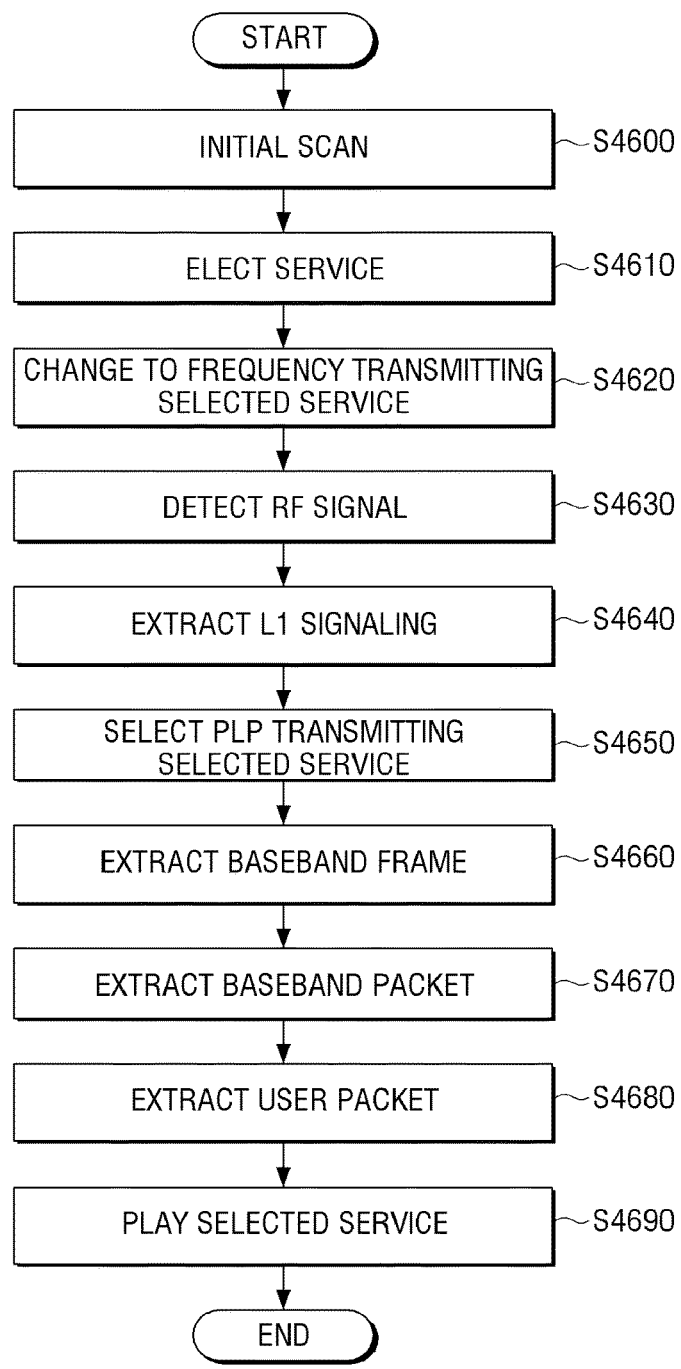
FIG. 16 is a flowchart illustrating a brief operation of a receiver until an actually selected service is played from a time when a user selects a service according to an exemplary embodiment.

FIG. 16 is a flowchart provided to briefly explain an operation of a receiving apparatus from a time point when a user selects a service to a time point when the selected service is played.

It is assumed that service information about all services that may be selected at an initial scan process of S4600 is obtained prior to a service select process at S4610. The service information may include information about an RF channel and a PLP which transmits data required for playing a specific service in a current broadcasting system. One example of the service information may be Program-Specific Information/Service Information (PSI/SI) of an MPEG-2 TS, which may be usually obtained through L2 signaling and upper layer signaling.

When a user selects a service at S4610, the receiving apparatus modifies a frequency transmitting the selected service at S4620, and performs extracting RF signals at S4630. While performing S4620 modifying the frequency transmitting the selected service, the service information may be used.

When the RF signals are extracted, the receiver performs S4640 extracting L1 signaling from the extracted RF signals. The receiving apparatus selects the PLP transmitting the selected service by using the extracted L1 signaling at S4650, and extracts baseband packets from the selected PLP at S4660. At S4650 selecting the PLP transmitting the selected service, the service information may be used.

Further, S4660 extracting the baseband packets may include selecting OFDM cells belonging to the PLP by demapping a transmission frame, extracting LLR values for coding/decoding LDPC, and decoding LDPC codes by using the extracted LLR values.

The receiving apparatus performs S4670 extracting an ALP packet from the extracted baseband packet by using header information about the extracted baseband packet, and performs S4680 extracting a user packet from the extracted ALP packet by using header information about the extracted baseband packet. The extracted user packet is used in S4690 playing the selected service. At S4670 extracting the ALP packet and at S4680 extracting the user packet, L1 signaling information obtained at S4640 extracting the L1 signaling may be used. In this case, a process of extracting the user packet from the ALP packet (restoring null TS packet and inserting a TS sync byte) is the same as described above. According to the exemplary embodiments as described above, various types of data may be mapped to a transmittable physical layer, and data processing efficiency may be improved.

Figure 17:
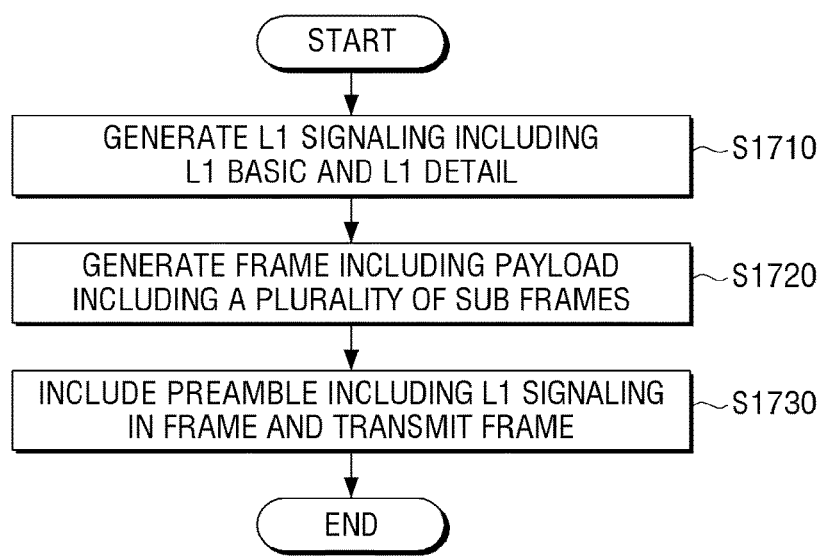
FIG. 17 is a flowchart illustrating a method of controlling a transmitting apparatus according to an exemplary embodiment.

FIG. 17 is a flowchart illustrating a method of controlling a transmitting apparatus, according to an exemplary embodiment.

Referring to FIG. 17, in operation 51710, L1 signaling including L1 basic and L1 detail is generated.

In operation S1720, a frame including a payload including a plurality of sub frames is generated.

In operation S1730, a preamble including the L1 signaling is included in the frame, and then the frame is transmitted.

Here, the L1 basic includes information for decoding a first sub frame of a plurality of sub frames.

Also, the L1 detail includes information for decoding the other sub frames except the first sub frame.

The information for decoding the first sub frame includes information about an FFT size of the first sub frame, a length of a guard interval, a PAPR, a scattered pilot pattern, a boundary symbol index, the number of OFDM symbols, the number of effective carriers, and a length of an additional guard interval.

Figure 18:
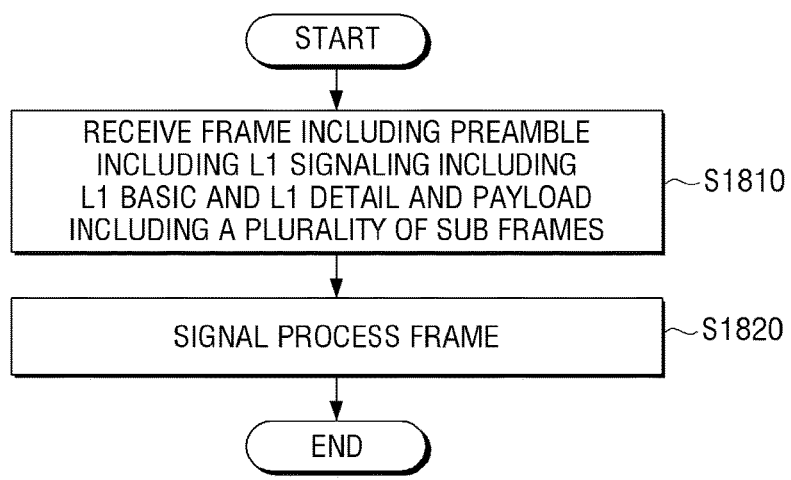
FIG. 18 is a flowchart illustrating a method of controlling a receiving apparatus according to an exemplary embodiment.

FIG. 18 is a flowchart illustrating a method of controlling a receiving apparatus, according to an exemplary embodiment.

Referring to FIG. 18, in operation S1810, the receiving apparatus receives a frame including a preamble including L1 signaling including L1 basic and L1 detail and a payload including a plurality of sub frames.

In operation S1820, the receiving apparatus signal-processes the frame.

Here, the signal-processing operation decodes the first sub frame based on the information included in the L1 basic and decodes the L1 detail in parallel with the decoding of the first sub frame.

Also, the method of controlling the receiving apparatus may further include completing the decoding of the first sub frame and then decoding the other sub frames except the first sub frame based on the decoded L1 detail.

There may be provided a non-transitory computer readable medium that stores a program sequentially performing a signal processing method.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

At least one of the components, elements, modules or units represented by a block as illustrated in FIGS. 2 and 6-12 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments and advantages are merely exemplary and are not to be construed as limiting the inventive concept. The inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A receiving apparatus comprising:
   a receiver configured to receive a frame transmitted from a transmitting apparatus;
   a demodulator configured to demodulate the frame; and
   a decoder configured to decode the demodulated frame,
   wherein the frame comprises a bootstrap, a preamble and a payload,
   wherein the bootstrap comprises a symbol used for an initial channel estimation in the receiving apparatus,
   wherein the preamble comprises first signaling information and second signaling information,
   wherein the payload comprises at least one sub frame,
   wherein the first signaling information comprises information required to decode the second signaling information and information required for an initial orthogonal frequency division multiplexing (OFDM) processing of a first sub frame among the at least one sub frame,
   wherein the second signaling information comprises information for a configuration of the at least one sub frame, and
   wherein the first signaling information is used in the receiver to facilitate the initial OFDM processing of the first sub frame without waiting for decoding of the second signaling information.

2. The receiving apparatus of claim 1, wherein the bootstrap is located at a beginning of the frame, the preamble is located following the bootstrap, and the payload is located following the preamble.

3. The receiving apparatus of claim 1, wherein the information required for the initial OFDM processing of the first sub frame comprises information about a Fast Fourier Transform (FFT) size of the first sub frame, a length of a guard interval, a Peak to Average Power Ratio (PAPR), a scattered pilot pattern, a boundary symbol index, a number of Orthogonal Frequency Division Multiplexing (OFDM) symbols, a number of effective carriers, and a length of an additional guard interval.

* * * * *